(12) United States Patent
Shimada

(10) Patent No.: US 11,954,240 B2
(45) Date of Patent: Apr. 9, 2024

(54) INFORMATION PROCESSING DEVICE, INFORMATION PROCESSING METHOD, AND PROGRAM

(71) Applicant: SONY CORPORATION, Tokyo (JP)

(72) Inventor: Daiki Shimada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 696 days.

(21) Appl. No.: 17/046,098

(22) PCT Filed: Jan. 29, 2019

(86) PCT No.: PCT/JP2019/002976
§ 371 (c)(1),
(2) Date: Oct. 8, 2020

(87) PCT Pub. No.: WO2019/207875
PCT Pub. Date: Oct. 31, 2019

(65) Prior Publication Data
US 2021/0042514 A1    Feb. 11, 2021

(30) Foreign Application Priority Data
Apr. 27, 2018    (JP) .................. 2018-087347

(51) Int. Cl.
*G06K 9/00*    (2022.01)
*B25J 9/16*    (2006.01)
(Continued)

(52) U.S. Cl.
CPC ............. *G06F 3/011* (2013.01); *B25J 9/1697* (2013.01); *G06F 3/167* (2013.01); *G06T 13/00* (2013.01);
(Continued)

(58) Field of Classification Search
CPC ........ G06F 3/017; G06F 3/011; G06F 3/0304; G06F 3/013; G06F 3/012; G06F 3/04883;
(Continued)

(56) References Cited

U.S. PATENT DOCUMENTS 10,133,933 B1 *  11/2018  Fisher .................... G06V 20/41
2015/0035828 A1    2/2015  Fradet
2019/0267136 A1 *  8/2019  Lord, IV ................. G06F 9/546

FOREIGN PATENT DOCUMENTS

CN        1555030 A    12/2004
CN      102549382 A     7/2012
(Continued)

*Primary Examiner* — Alex Kok S Liew
(74) *Attorney, Agent, or Firm* — Paratus Law Group, PLLC

(57) ABSTRACT

An information processing device includes an identification unit that detects a hand region of a person who is in contact with an object included in an input image and identifies an object region that is a region of the object based on a result thereof, a specification unit that specifies an unknown object candidate region that is a candidate for a region of an unknown object from among the object regions identified by the identification unit, a determination unit that determines whether the object is an unknown object based on the unknown object candidate region, and a generation unit that generates, when the object is an unknown object, feedback information for changing an attitude of the unknown object with respect to the person.

20 Claims, 15 Drawing Sheets

(51) Int. Cl.
*G06F 3/01* (2006.01)
*G06F 3/16* (2006.01)
*G06T 13/00* (2011.01)
*G06V 10/25* (2022.01)
*G06V 10/56* (2022.01)
*G06V 20/20* (2022.01)
*G06V 40/10* (2022.01)
*B25J 13/00* (2006.01)

(52) U.S. Cl.
CPC .............. *G06V 10/25* (2022.01); *G06V 10/56* (2022.01); *G06V 20/20* (2022.01); *G06V 40/107* (2022.01); *B25J 13/003* (2013.01)

(58) Field of Classification Search
CPC ...... G06F 3/038; G06F 3/0484; G06F 3/0346; G06F 2203/04106; G06F 3/041; G06F 3/0446; G06F 13/105; G06F 2203/0381; G06F 3/005; G06F 3/01; G06F 3/023; G06F 3/0445; G06F 3/0481; G06F 3/14; G06F 3/1423; G06F 3/04812; G06F 1/1626; G06F 1/1684; G06F 1/169; G06F 16/532; G06F 18/24143; G06F 2203/0339; G06F 2203/04104; G06F 3/03547; G06F 3/042; G06F 3/04845; G06F 2203/04102; G06F 2203/04806; G06F 3/0393; G06F 3/0416; G06F 3/04166; G06F 3/0418; G06F 3/046; G06F 3/04815; G06F 3/0485; G06F 1/1686; G06F 18/2113; G06F 18/2415; G06F 3/016; G06F 3/03545; G06F 3/04842

See application file for complete search history.

(56) References Cited

FOREIGN PATENT DOCUMENTS

| | | |
|---|---|---|
| CN | 105447473 A | 3/2016 |
| CN | 107150347 A | 9/2017 |
| CN | 107220245 A | 9/2017 |
| JP | 2000306099 A | 11/2000 |
| JP | 2007-219765 A | 8/2007 |
| JP | 2008-257353 A | 10/2008 |
| JP | 2011-198349 A | 10/2011 |
| JP | 6164319 B2 | 7/2017 |

* cited by examiner

A

B

A

B

A

B

C

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2019/002976 (filed on Jan. 29, 2019) under 35 U.S.C. § 371, which claims priority to Japanese Patent Application No. 2018-087347 (filed on Apr. 27, 2018), which are all hereby incorporated by reference in their entirety.

TECHNICAL FIELD

The present disclosure relates to an information processing device, an information processing method, and a program.

BACKGROUND ART

A technique has been proposed in which a device such as a robot recognizes an unknown object and learns the shape and the like of the unknown object. For example, PTL 1 listed below describes a technique in which a robot rotates an object handed by a user so that the robot can acquire images based on multiple viewpoints.

CITATION LIST

Patent Literature

PTL 1

Japanese Patent No. JP 6164319B

SUMMARY

Technical Problem

According to the technique described in PTL 1, while the robot rotates a handed object to acquire multi-viewpoint images, there may be restrictions on the contents of the acquired multi-viewpoint images, for example, an attitude of the object in the images, depending on the type and the movable range of the robot.

Therefore, an object of the present disclosure is to provide an information processing device, an information processing method, and a program which can generate, in a case where an object to be recognized by a device is an unknown object, feedback information for changing the attitude of the unknown object.

Solution to Problem

The present disclosure is, for example, an information processing device that includes
an identification unit that detects a hand region of a person who is in contact with an object included in an input image and identifies an object region that is a region of the object based on a result thereof,
a specification unit that specifies an unknown object candidate region that is a candidate for a region of an unknown object from among the object regions identified by the identification unit,
a determination unit that determines whether the object is an unknown object based on the unknown object candidate region, and
a generation unit that generates, when the object is an unknown object, feedback information for changing an attitude of the unknown object with respect to the person.

The present disclosure is, for example, an information processing method that includes
detecting, by an identification unit, a hand region of a person who is in contact with an object included in an input image to identify an object region that is a region of the object based on a result thereof,
specifying, by a specification unit, an unknown object candidate region that is a candidate region of an unknown object region from among the object regions identified by the identification unit,
determining, by a determination unit, whether the object is an unknown object based on the unknown object candidate region, and
generating, by a generation unit, when the object is an unknown object, feedback information for changing an attitude of the unknown object with respect to the person.

The present disclosure is, for example, a program that causes a computer to execute an information processing method that includes
detecting, by an identification unit, a hand region of a person who is in contact with an object included in an input image to identify an object region that is a region of the object based on a result thereof,
specifying, by a specification unit, an unknown object candidate region that is a candidate region of an unknown object region from among the object regions identified by the identification unit,
determining, by a determination unit, whether the object is an unknown object based on the unknown object candidate region, and
generating, by a generation unit, when the object is an unknown object, feedback information for changing an attitude of the unknown object with respect to the person.

Advantageous Effects of Invention

According to at least one embodiment of the present disclosure, it is possible to generate, when an object to be recognized by a device is an unknown object, feedback information for changing an attitude of the unknown object. Note that the advantageous effect described here is not necessarily limited, and any advantageous effects described in the present disclosure may be enjoyed. Further, the content of the present disclosure should not be limitedly interpreted by the exemplified advantageous effects.

DESCRIPTION OF EMBODIMENTS

Hereinafter, embodiments of the present technique and others will be described with reference to the drawings. Note that the description will be given in the following order.

1. Embodiment
Application Example
Modified Example

Embodiments and others described below are preferred specific examples of the present disclosure, and the content of the present disclosure is not limited to the embodiments and the others.

1. Embodiment

Problems to be Considered. In an Embodiment

First, in order to facilitate understanding of the present disclosure, problems to be considered in an embodiment will be described. As described above, a technique has been proposed in which a machine such as a robot detects and recognizes an object in the field of robotics or agents. In such a technical field, a robot or the like extracts features such as shape and color of an object to be detected and recognized from data in advance, and recognizes a known object from an image based on the features. Therefore, when a user causes a machine to recognize a new object later, the machine needs to know the shape of the unknown object. Note that the unknown object means such an object that an information processing device such as a robot does not have information related to feature values such as the shape and color of the object, that is, an unknown object as seen from the robot side.

When the machine learns about an unknown object, the machine needs to specify the region of the unknown object. Therefore, it is necessary to exactly specify the boundary of the unknown object. Further, in order to accurately determine features such as the shape of the unknown object, it is preferable to present the machine with unknown objects having different attitudes. Further, in order to change the attitude of the unknown object, it is preferable that the changing is made by a user (person) who is in contact with the unknown object, not on the robot side whose movable range is restricted. Note that the contact with the unknown object means a state where the user's hand touches the unknown object or a state where the unknown object is held by the user's hand. Further, the user's hand may be any of the user's finger, palm, or arm, all of them, or a combination of some of them. Based on such points of view, the embodiment will be described in detail.

Outline of Embodiment

In the embodiment, an autonomous mobile robot will be described as an example of an information processing device. The information processing device is not limited to a robot, and may be a voice input/output device having a portable size, called an agent or a smart speaker, may be a function of voice communication with a user of the device, or may be a personal computer or a smart phone.

Figure 1:
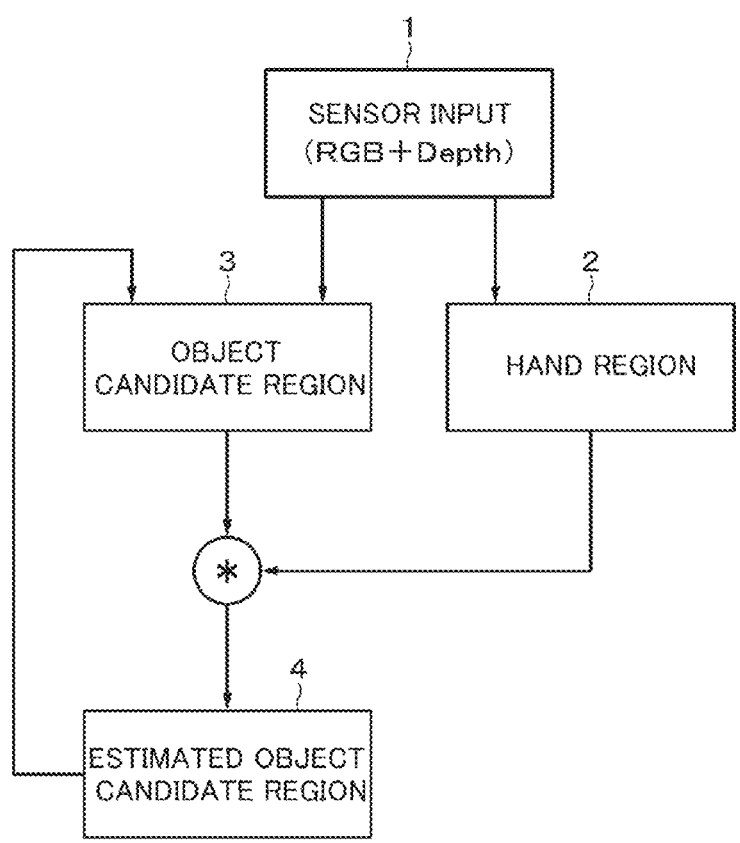
FIG. 1 is a diagram for explaining an outline of an embodiment.

FIG. 1 is a diagram for explaining an outline of the embodiment. In processing according to the embodiment, an input from a sensor (sensor input 1) is acquired. The sensor input 1 includes RGB (Red/Green/Blue) and depth information, and an example is image data obtained by an image sensor.

In the present embodiment, the region of the unknown object is estimated based on a place touched by the user's hand. Specifically, processing 2 of estimating a hand region included in the image data is performed. Further, a region in contact with the hand region is sequentially selected from object candidate regions 3 obtained from the sensor input 1 and the latest estimation result. Further, the object region is modified sequentially using time-series information to more accurately estimate the object candidate region, so that an estimated object candidate region 4 is obtained. Specifically, encouraging the user to hold the object differently makes it possible to obtain an input such that the region of the unknown object is more accurately estimated.

[Configuration Example of Information Processing Device]

Figure 2:
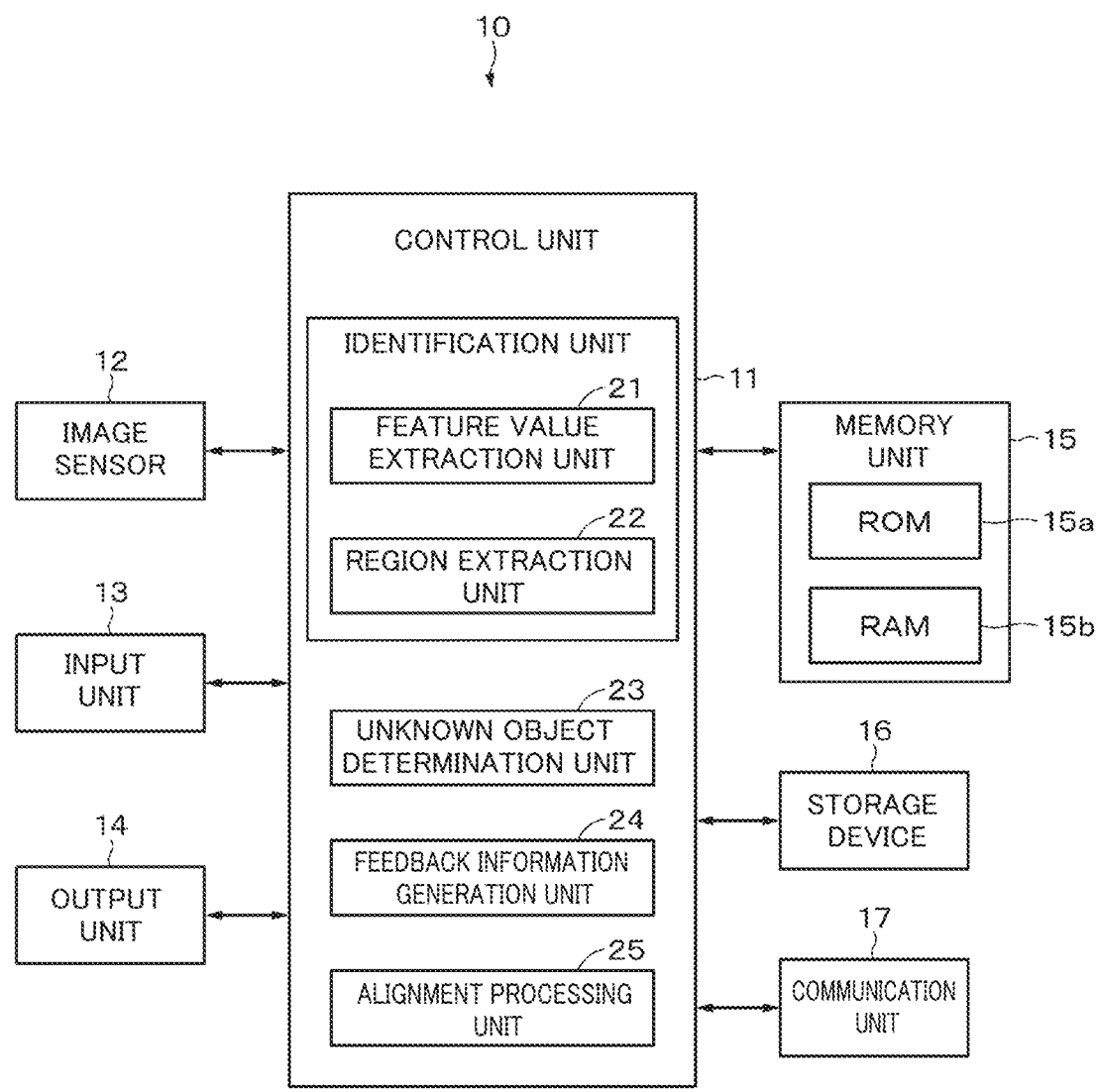
FIG. 2 is a block diagram illustrating a configuration example of an information processing device according to the embodiment.

FIG. 2 is a block diagram illustrating a configuration example of the information processing device (information processing device 10) according to the embodiment. The information processing device 10 includes, for example, a control unit 11, an image sensor 12, an input unit 13, an output unit 14, a memory unit 15, a storage device 16, and a communication unit 17.

The control unit 11 includes, for example, a CPU (Central Processing Unit) and controls the units of the information processing device 10. The control unit 11 includes a feature value extraction unit 21, a region extraction unit 22, an unknown object determination unit 23, a feedback information generation unit 24, and an alignment processing unit 25, as functional blocks. Details of the processing executed under the control of the control unit 11 will be described below.

The image sensor 12 is a sensor that acquires image data having RGB and depth information. Note that the image data may be still image data or moving image data. Examples of the image sensor 12 include a CMOS (Complementary Metal Oxide Semiconductor) sensor and a CCD (Charge Coupled. Device) sensor. The image data acquired via the image sensor 12 is supplied to the control unit 11, and various image processing is performed on the image data by the control unit 11.

The input unit 13 receives an operation input from a user. Examples of the input unit 13 include, for example, buttons, levers, switches, a touch panel, a microphone, and a line-of-sight detection device. The input unit 13 generates an operation signal according to an input made to the input unit 13 itself, and supplies the operation signal to the control unit 11. The control unit 11 executes processing according to the operation signal.

The output unit 14 outputs various data processed by the control unit 11 to the user. Examples of the output unit 14 include a speaker device that outputs voice to the user and a display that displays a still image, a moving image, and the like. Examples of the display include an LCD (Liquid Crystal Display), an organic EL (Electro Luminescence) display, and a projector. The output unit 14 performs output based on feedback information described below.

The memory unit 15 is a memory connected to the control unit 11, and includes, for example, a ROM (Read Only Memory) 15a and a RAM (Random Access Memory) 15b. A program to be executed by the control unit 11 is stored in the ROM 15a. The RAM 15b is used as a work memory when the control unit 11 executes the program.

The storage device 16 is a storage unit that stores various types of information. Examples of the storage device 16 include a magnetic storage device such as an HDD (Hard. Disk Drive), a semiconductor storage device, an optical storage device, and a magneto-optical storage device.

The communication unit 17, which is an example of an information acquisition unit, communicates with another device connected via a network such as the Internet. The communication unit 17 has a configuration such as a modulation and demodulation circuit, an antenna, and the like that comply with communication standards. The communication performed by the communication unit 17 may be wired communication or wireless communication. Examples of the wireless communication include using LAN (Local Area Network), Bluetooth (registered trademark), Wi-Fi (registered trademark), WUSB (Wireless USB), and the like. The communication unit 17 supplies, for example, a feature value of an unknown object to an external device and acquires information related to the unknown object from the external device. In this way, the information processing device 10 is configured to be able to acquire various types of information from a connection destination of the communication unit 17.

Note that the information processing device 10 may be configured to be driven based on the electric power supplied from a commercial power source, or may be configured to be driven based on the electric power supplied from a rechargeable lithium ion secondary battery or the like.

The configuration example of the information processing device 10 is described above, but the configuration of the information processing device 10 can be changed as appropriate. Specifically, the information processing device 10 may not have a part of the illustrated configuration, or may have a different configuration from the illustrated configuration.

[Functional Blocks of Control Unit]

Figure 3:
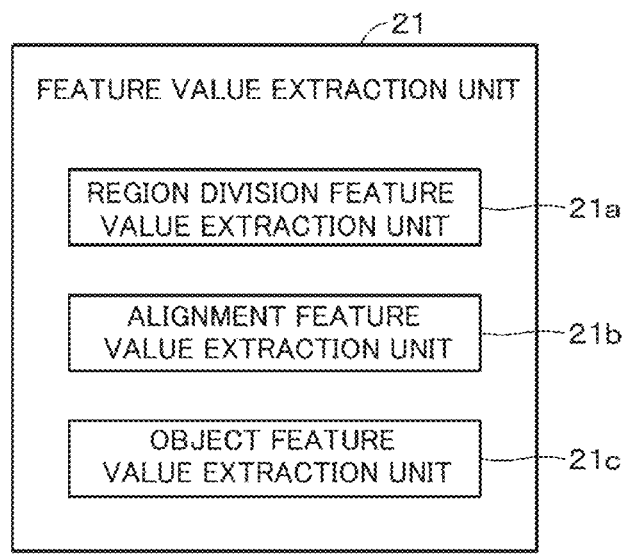
FIG. 3A is a diagram for explaining functions of a feature value extraction unit according to the embodiment.
FIG. 3B is a diagram for explaining functions of a region extraction unit according to the embodiment.
Figure 3:
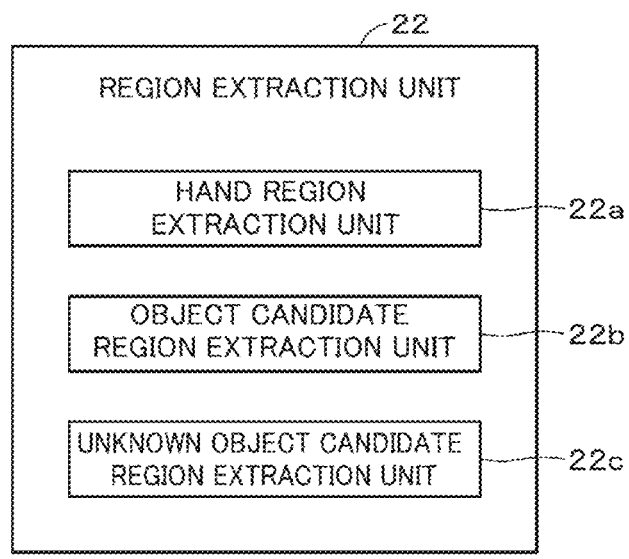

As illustrated in FIG. 3A, the feature value extraction unit 21 includes a region division feature value extraction unit 21a, an alignment feature value extraction unit 21b, and an object feature value extraction unit 21c. Further, as illustrated in FIG. 3B, the region extraction unit 22 has a hand region extraction unit 22a, an object candidate region extraction unit 22b, and an unknown object candidate region extraction unit 22c. The operations of the respective functional blocks included in the control unit 11 will be described below.

(Region Division Feature Value Extraction Unit)

Figure 4:
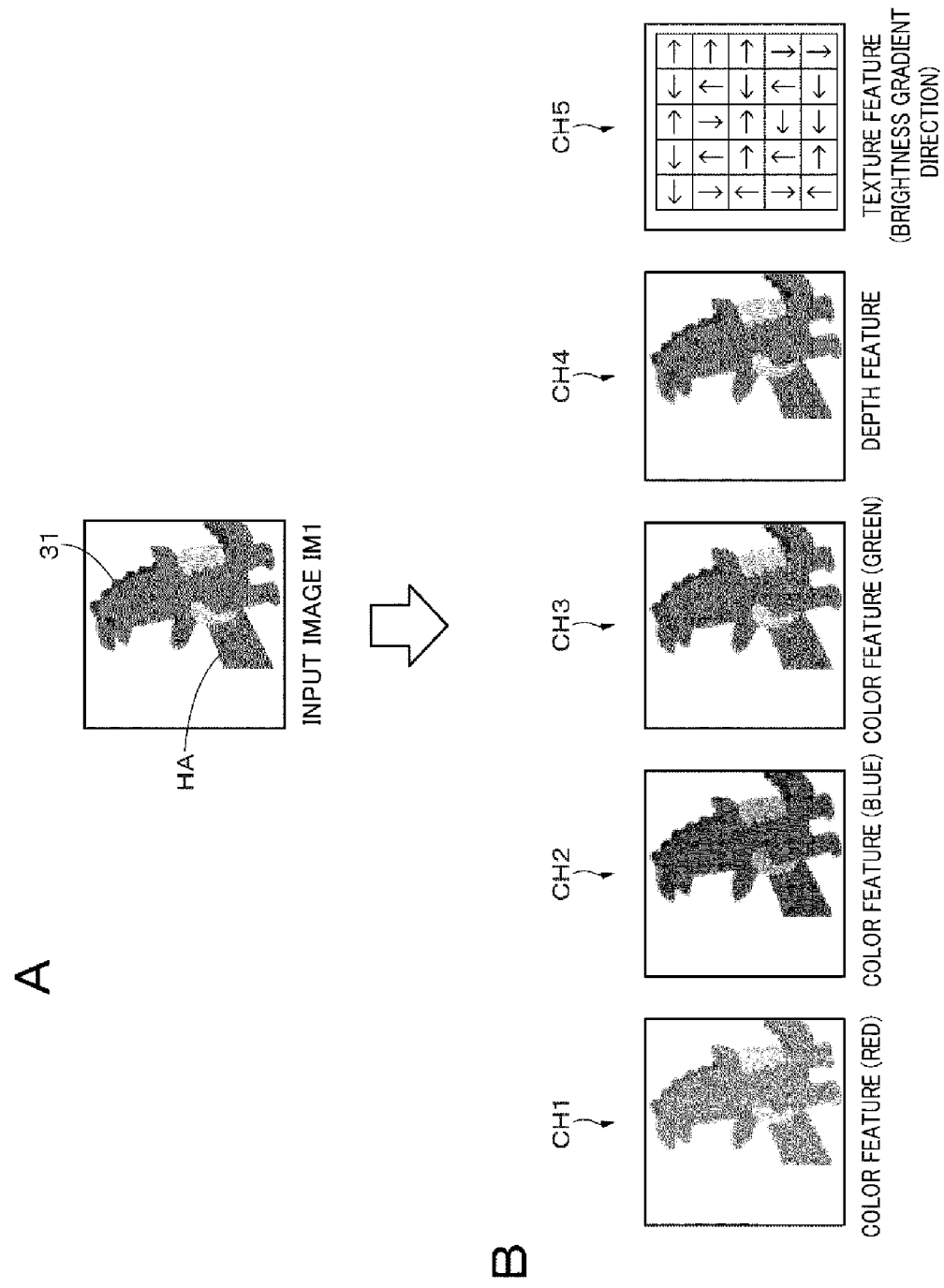
FIG. 4A and FIG. 4B are diagrams for explaining an example of a function of a region division feature value extraction unit according to the embodiment.

FIGS. 4A and 4B are diagrams for explaining an example of a function of the region division feature value extraction unit 21a. For example, the image illustrated in FIG. 4A is input as an input image IM1 via the image sensor 12. The input image IM1 is, for example, a still image in which a user's hand HA holds an object 31 that is a stuffed animal resembling a dinosaur. Note that the object 31 will be described as an unknown object to the information processing device 10.

The region division feature value extraction unit 21a extracts a feature value necessary for obtaining the region of the object (hereinafter, appropriately referred to as the object region) at the pixel level. For example, the region division feature value extraction unit 21a performs known color detection processing, depth detection processing, and the like on the input image IM1 to extract RGB color features CH1 to CH3 of the input image IM1, a depth feature CH4 of the input image IM1, a texture feature CH5 corresponding to a brightness gradient direction, and others as illustrated in FIG. 4B. The texture feature CH5 is obtained, for example, by applying a predetermined differential filter to the input image IM1.

(Alignment Feature Value Extraction Unit)

Figure 5:
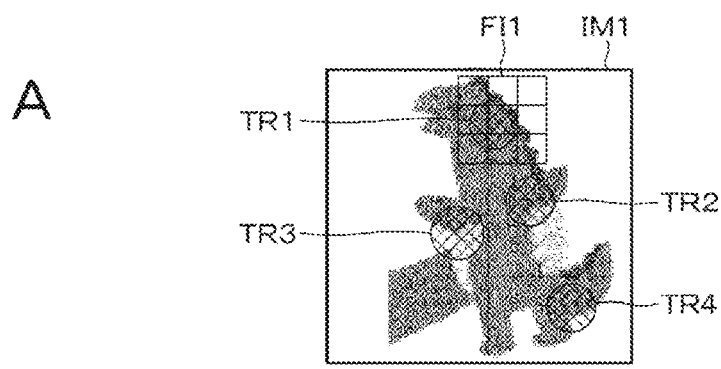
FIGS. 5A and 5B are diagrams for explaining an example of a function of an alignment feature value extraction unit according to the embodiment.
Figure 5:
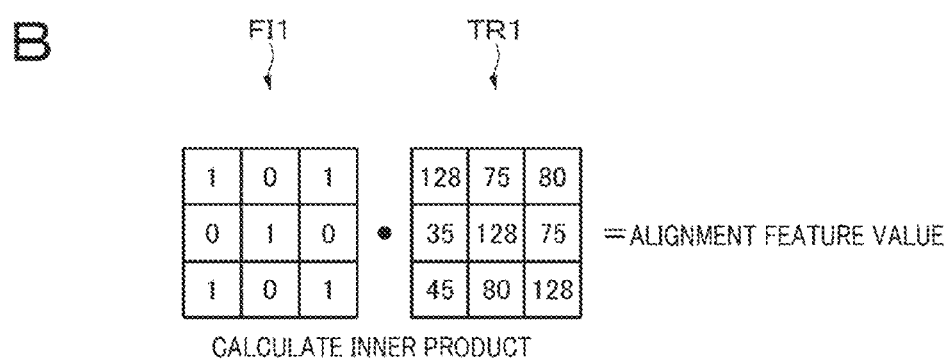

Next, the alignment feature value extraction unit 21b will be described. FIGS. 5A and 5B are diagrams for explaining an example of a function of the alignment feature value extraction unit 21b. The alignment feature value extraction unit 21b sets a plurality of tracking points (positioning points) for the input image IM1 in order to match the attitude of the object at the time of the initial processing (at t=0) with the attitude of the object in a frame, in other words, in order to grasp a change in attitude of the object. As schematically illustrated in FIG. 5A, for example, four tracking points TR1 to TR4 are set for the input image IM1. Note that, in the following description, if the tracking points do not need to be distinguished from each other, each of them will be referred to as the tracking point TR, as appropriate. The tracking point TR, may be one pixel or a block composed of a plurality of pixels.

The alignment feature value extraction unit 21b extracts a feature value (local feature value) of the tracking point TR. For example, a filter FI1 for extracting an alignment feature value is applied to a region around the tracking point TR. The filter FI1 is, for example, a 3×3 filter, but its size can be changed as appropriate. For example, as illustrated in FIG. 5B, an inner product of the filter coefficients of the filter FI1 and the pixel values of the block for the tracking point TR1 is calculated. As a result of the calculation, the alignment feature value for the tracking point TR1 is obtained. The same calculation is performed for the other tracking points TR. Performing a search using the alignment feature value in input images input the next time and thereafter makes it possible to search for the tracking point TR in the input images.

(Object Feature Value Extraction Unit)

Figure 6:
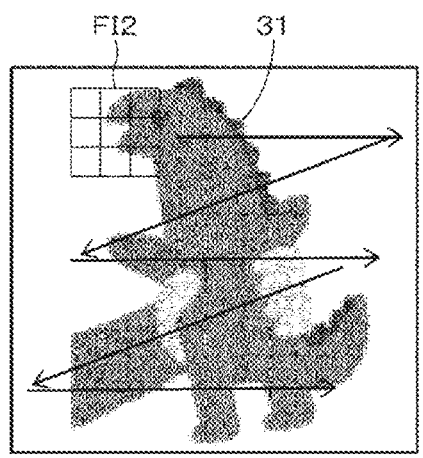
FIG. 6 is a diagram for explaining an example of a function of an object feature value extraction unit according to the embodiment.
Figure 6:
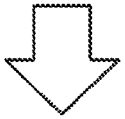
Figure 6:
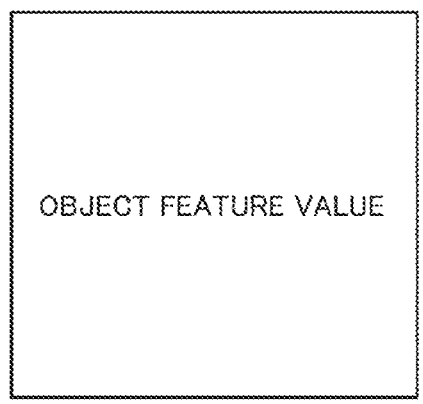

Next, the object feature value extraction unit 21c, which is an example of a feature value acquisition unit, will be described. When an image including the object 31 is input after the object 31 has been recognized as an unknown object, the object feature value extraction unit 21c acquires a vector for characterizing that object being, that is, a feature value of the unknown object (hereinafter, appropriately referred to as the object feature value), to perform recognition processing on the object 31. As an example, as schematically illustrated in FIG. 6, the object feature value extraction unit 21c calculates an inner product of an object feature value extraction filter FI2 for extracting the object feature value and a region estimated as the region of the unknown object, thereby obtaining the object feature value of the object 31. Note that a value obtained by performing alignment feature value extraction processing on the entire region of the unknown object may be used as the object feature value of the object 31.

(Hand Region Extraction Unit)

Figure 7:
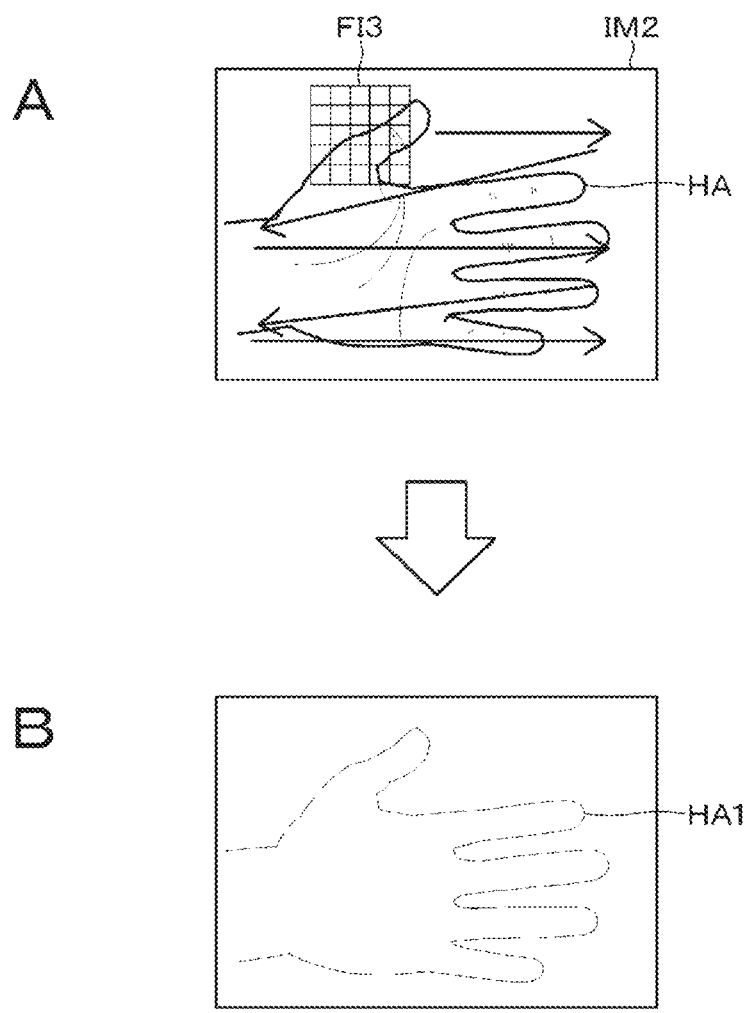
FIGS. 7A and 7B are diagrams for explaining an example of a function of a hand region extraction unit according to the embodiment.

Next, the hand region extraction unit will be described. The hand region extraction unit 22a detects the region of the user's hand that is in contact with the object included in the input image. An example of processing executed by the hand region extraction unit 22a will be described with reference to FIG. 7. For example, as illustrated in FIG. 7A, assume an input image IM2 including a hand HA1. The hand region extraction unit 22a applies a filter FI3 for extracting a hand region having a predetermined size and coefficients to the input image IM2. This filtering processing extracts the region of a hand HA1 as the hand region as illustrated in FIG. 7B.

(Object Candidate Region Extraction Unit)

Figure 8:
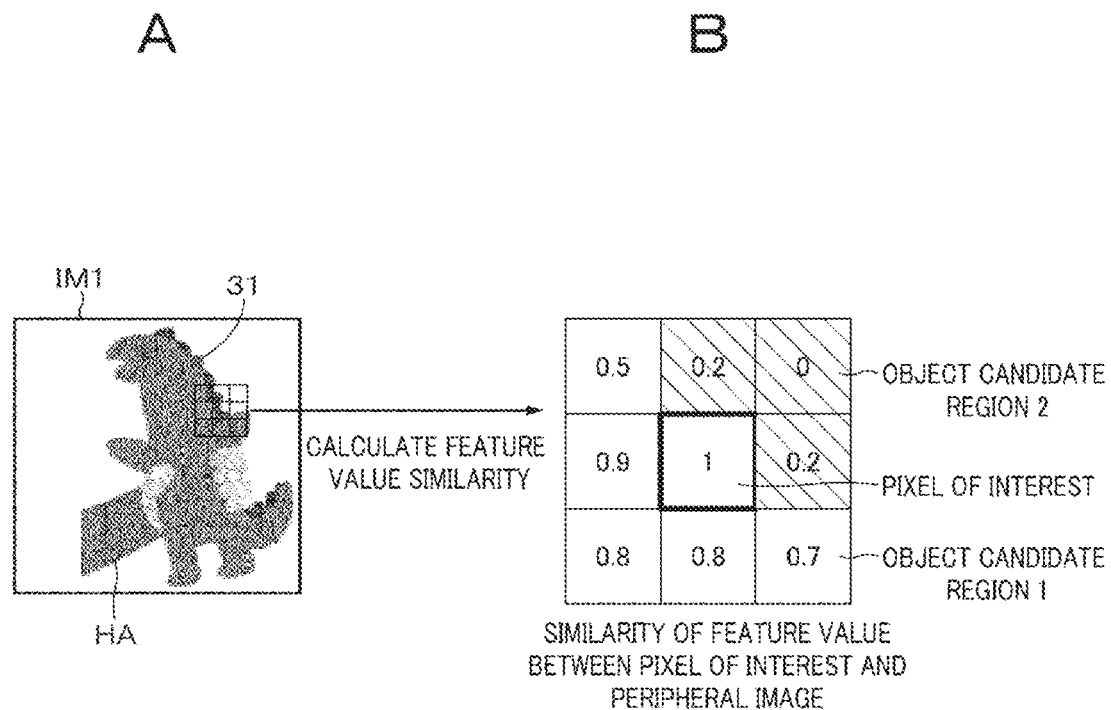
FIGS. 8A and 8B are diagrams for explaining an example of a function of an object candidate region extraction unit according to the embodiment.

Next, the object candidate region extraction unit 22b, which is an example of an identification unit, will be described. The object candidate region extraction unit 22b extracts the same region in which a certain object is estimated to exist. FIGS. 8A and 8B are diagrams for explaining a processing example executed by the object candidate region extraction unit 22b. As illustrated in FIG. 8A, a predetermined pixel in the input image IM1 is set as the pixel of interest.

Then, a similarity between the pixel of interest and each peripheral pixel adjacent to the pixel of interest is calculated. For example, the feature values obtained by the processing of the region division feature value extraction unit 21a are used to perform a calculation in which the closer the feature values are to each other the higher the similarity is. FIG. 8B is a diagram illustrating an example of similarities between the feature value of the pixel of interest and the feature values of the peripheral pixels with respect to the pixel of interest. For example, the object candidate region extraction unit 22b sets a threshold value for the similarity, and determines that the pixel having the similarity equal to or higher than the threshold value is the same region as the pixel of interest. For example, the threshold value is set to 0.5.

In the present embodiment, as illustrated in FIG. 8B, five peripheral pixels that are not hatched are determined to be the same region (object candidate region 1) as the pixel of interest in the center, and three peripheral pixels that are hatched are determined to be a region (object candidate region 2) different from the center pixel of interest. Then, the object candidate region extraction unit 22b combines the pixels determined to be the same region. The object candidate region extraction unit 22b extracts the object candidate region while changing the pixel of interest in the input image IM1.

(Unknown Object Candidate Region Extraction Unit)

Figure 9:
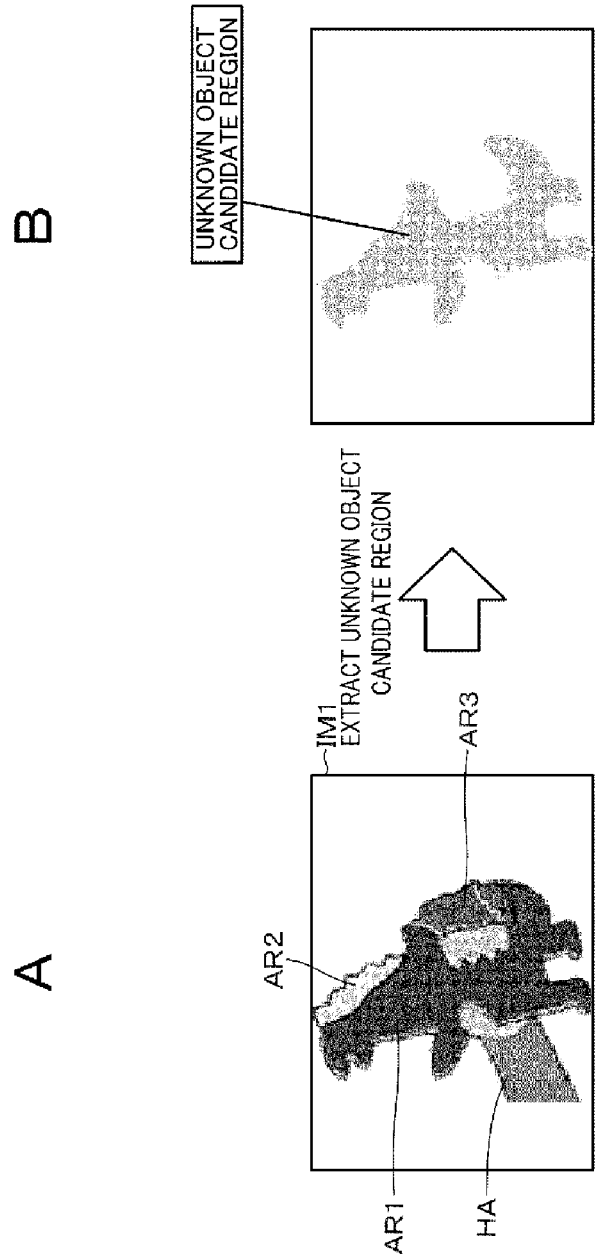
FIGS. 9A and 9B are diagrams for explaining an example of a function of an unknown object candidate region extraction unit according to the embodiment.

Next, the unknown object candidate region extraction unit 22c, which is an example of the identification unit, will be described. A region corresponding to the hand HA is extracted by the hand region extraction unit 22a, and a plurality of object candidate regions determined to be the same region are extracted by the object candidate region extraction unit 22b. The unknown object candidate region extraction unit 22c specifies an unknown object candidate region that is a candidate for the region of the unknown object from the plurality of object candidate regions. FIG. 9A shows an example of the plurality of object candidate regions.

As illustrated in FIG. 9A, the region of the hand HA is extracted from the input image IM1. Further, three object candidate regions AR1 to AR3 are extracted from the input image IM1 by the object candidate region extraction unit 22b. The unknown object candidate region extraction unit 22c selects, from the object candidate regions AR1 to AR3, a region which is adjacent to the hand region and in which the depth of the hand and the depth of the object region have a certain small difference, as the unknown object candidate region. Note that alignment with the unknown object candidate region that was extracted in the past (e.g., in one frame before) may be performed to output an averaged region as the unknown object candidate region.

A specific example will be described. The object candidate region AR1 is adjacent to the hand region, and thus it is extracted as the unknown object candidate region. The object candidate region AR2 is a region corresponding to the protrusion of the object 31 on the back. In the present example, since the object candidate region AR2 is not adjacent to the hand region, it is determined not to be the unknown object candidate region. Further, the object candidate region AR3 is adjacent to the hand region. However, in the present example, the depth (depth position) of the hand region and the depth of the object candidate region AR3 are apart from each other by a predetermined distance or more, and thus the object candidate region AR3 is determined not to be the unknown object candidate region. By such processing, the unknown object candidate region extraction unit 22c extracts the unknown object candidate region. FIG. 9B illustrates an example of the unknown object candidate region extracted by the unknown object candidate region extraction unit 22c.

Note that when the object candidate region extraction unit 22b extracts an object candidate region, any pixel can be set as the pixel of interest to be initially set, but in the present embodiment, a pixel in the vicinity of the hand HA extracted by the hand region extraction unit 22a is set as the pixel of interest. As a result, when the pixel of interest is set in a uniform background portion after the object candidate regions AR1 to AR3 are extracted, the similarities between the pixel of interest and the peripheral pixels remain high. When such a state is reached, aborting the processing makes it possible to simplify the processing executed by the object candidate region extraction unit 22b.

(Unknown Object Determination Unit)

Next, the unknown object determination unit 23 will be described. The determination unit 23 determines whether or not the object 31 is an unknown object based on the unknown object candidate region. The unknown object determination unit 23 searches, for example, whether a region having a certain similarity with the unknown object candidate region is stored in the storage device 16. As a result of the search, if the region having the certain similarity with the unknown object candidate region is stored in the storage device 16, the unknown object determination unit 23 determines that the object 31 is not an unknown object but a known object, that is, a learned object. As a result of the search, if the region having the certain similarity with the unknown object candidate region is not stored in the storage device 16, the unknown object determination unit 23 determines that the object 31 is an unknown object.

(Feedback Information Generation Unit)

Next, the feedback information generation unit 24 will be described. When the object 31 is an unknown object, the feedback information generation unit 24 generates feedback information for encouraging the user to change the attitude of the object 31, which is an unknown object. The feedback information may be any information such as voice information, display information, a combination of these pieces of information, and the like. Feedback based on the feedback information is notified to the user via the output unit 14.

(Alignment Processing Unit)

When the object 31 is an unknown object, the alignment processing unit 25 performs alignment processing on a plurality of point-of-view images acquired based on the change in attitude of the object 31 made according to the feedback information.

[Example of Feedback Information]

Incidentally, the object candidate region AR2 extracted by the object candidate region extraction unit 22b as described above is originally a region of the object 31, but is excluded from unknown object candidate regions due to the accuracy of image processing and the like. Accordingly, there is a high possibility that an accurate unknown object region cannot be obtained by only one step of processing. Therefore, in the present embodiment, the information processing device 10 provides the user with feedback based on the feedback information to encourage the user to change the place where the object 31 is held. Then, an unknown object candidate region is extracted again by performing the same processing as the above-mentioned processing a plurality of times. Such processing is performed a predetermined number of times to obtain a plurality of unknown object candidate regions. The control unit 11 can obtain an accurate unknown object candidate region, in other words, the shape of the unknown object, by integrating the obtained plurality of unknown object candidate regions, for example, after the alignment processing.

In this way, feedback is provided to the user in order for the information processing device 10 to accurately obtain the region of the unknown object. The feedback information generation unit 24 generates feedback information for providing feedback to the user. Output based on the feedback information may be voice output, display output of video and the like, or a combination thereof, or may be a predetermined operation of the information processing device 10. The control unit 11 supplies the generated feedback information to the output unit 14 having a configuration corresponding to the feedback information. This provides feedback to the user.

An example of feedback provided to the user will be described. For example, feedback using voice is provided to the user. In this case, the output unit 14 is composed of a speaker device. Then, the speaker device reproduces a message, for example, "Show the right side of your held object" or "Then, show the left side of your held object". The user changes the attitude of the object 31 in accordance with the message. Since the user, that is, the person, can freely change the object 31, the attitude of the object 31 can be appropriately changed according to the feedback.

Figure 10:
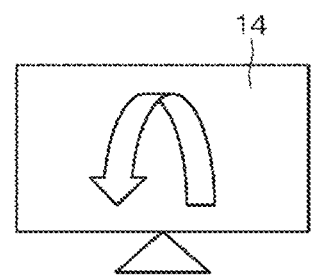
FIGS. 10A to 10C are diagrams for explaining examples of feedback provided to the user.
Figure 10:
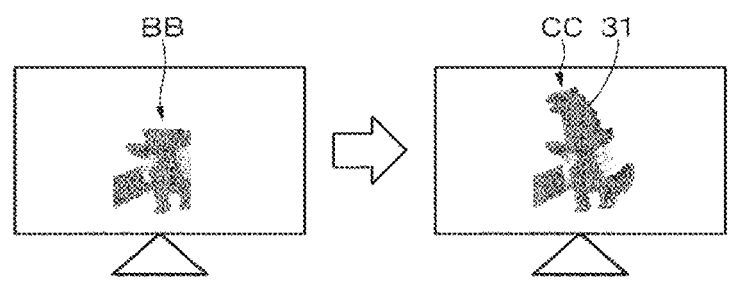
Figure 10:
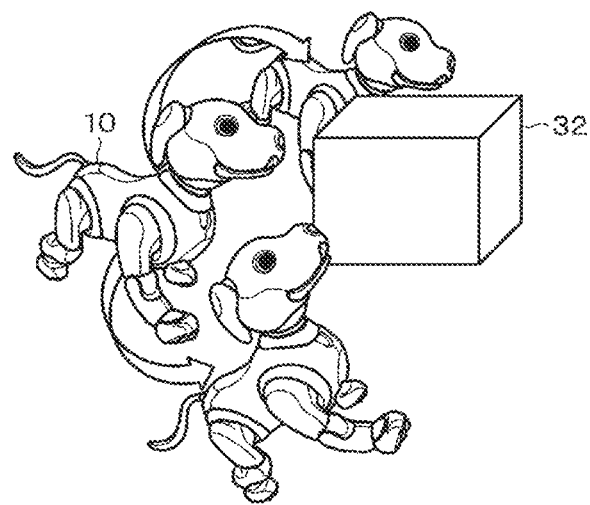

Further, feedback using a display may be provided by the user. In this case, the output unit 14 is composed of a display or a projector, which is a display device. Then, for example, the direction of an arrow as illustrated in FIG. 10A is indicated on the display. The user changes the place where the object 31 is held in accordance with the direction of the arrow to change the attitude of the object 31. Needless to say, the content displayed on the display or the like is not limited to the arrow.

A result of identifying the unknown object candidate region extracted by the information processing device 10 may be fed back to the user. For example, as illustrated in FIG. 10B, an unknown object candidate region BB extracted by the information processing device 10 is displayed on the display. The user who sees this unknown object candidate region BB can understand that the image sensor 12 of the information processing device 10 cannot acquire information on the vicinity of the head of the object 31. Accordingly, the user appropriately changes the attitude of the object 31 with respect to the image sensor 12 so that the vicinity of the head appears. As a result, the unknown object candidate region extraction processing is performed a plurality of times according to a plurality of changes in attitude, so that an accurate unknown object candidate region is extracted by the information processing device 10. Note that, as illustrated in FIG. 10B, the extracted unknown object candidate region may be displayed on the display as an unknown object candidate region CC.

If the information processing device 10 can move autonomously, the information processing device 10 may extract an unknown object candidate region in a certain attitude, then move autonomously, and extract an unknown object candidate region in a different attitude. For example, as illustrated in FIG. 10C, assume that the information processing device 10 is a dog-shaped robot and the unknown object is a box-shaped object 32. The object 32 is held by a user's hand (not illustrated). In such a case, the information processing device 10 may autonomously move left, right, or other, acquire images of the object 32 from different angles, and extract unknown object candidate regions based on the acquired images.

Figure 11:
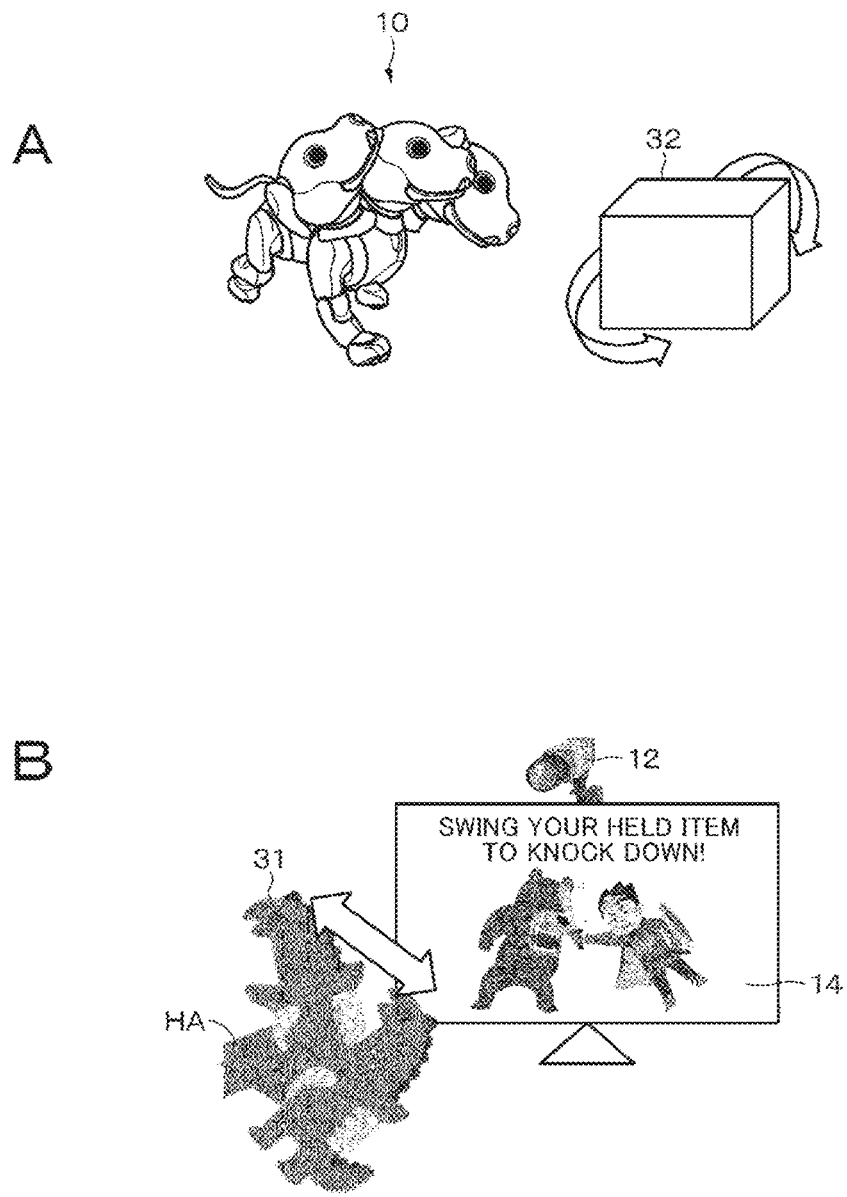
FIGS. 11A and 11B are diagrams for explaining other examples of feedback provided to the user.

Further, if the information processing device 10 can move autonomously, feedback may be provided to the user by the movement of the information processing device 10 itself. For example, assume that the information processing device 10 is a dog-shaped robot and the unknown object is a box-shaped object 32. For example, as illustrated in FIG. 11A, the information processing device 10, which is a dog-shaped robot, operates so that the head provided with the image sensor faces a side of the object 32. A user who sees such an operation changes the way of holding the object 32 so as to show the side surface of the object 32 and the like to the information processing device 10 according to the movement of the information processing device 10. In this way, feedback may be provided by the movement of the information processing device 10.

Further, feedback may be provided so that the user does not recognize that the feedback is for encouraging the user to change the attitude of the unknown object. Such feedback includes feedback including animation display, and more specifically, feedback using a game (gamification).

For example, as illustrated in FIG. 11B, assume a display serving as the output unit 14, and an image capturing device including the image sensor 12 is attached to the upper part of the display. The image capturing device is provided at a position of capturing an image in front of the display. In the capture range of the image capturing device, a user holds the above-mentioned object 31 with a hand HA.

For example, a text message of "Swing your held item to knock down!" are displayed on the display, as well as characters of a game. Accordingly, the user is encouraged to move the object 31 in such a manner that the movement of the hand HA and the movement of the object on the screen are linked. Based on the game-like display, the user performs a motion such as swinging the object 31 being held. The image sensor 12 acquires images of the object 31 having different attitudes according to the user's motion. An unknown object candidate region is extracted based on the acquired plurality of point-of-view images. After the processing is completed, a message indicating that the game is over is displayed on the display.

At this time, the user feels to enjoy the game while moving the object 31, and does not recognize that the object 31 is being moved in order to cause the information processing device 10 to recognize the object 31. In this way, feedback may be provided that can entertain the user and naturally encourage the user to change the attitude of the unknown object.

[Processing Flow]

Figure 12:
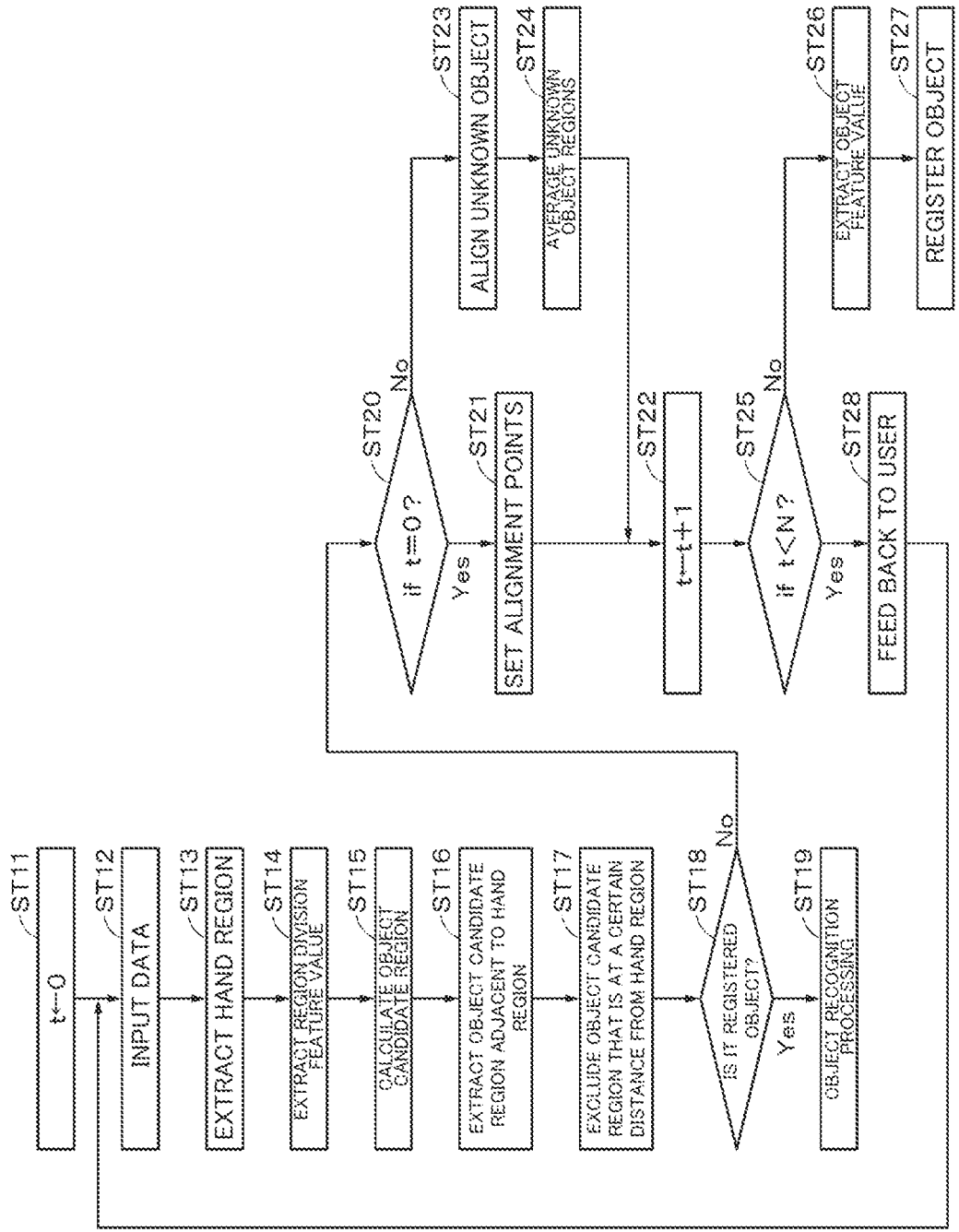
FIG. 12 is a flowchart illustrating a flow of processing performed by the information processing device according to the embodiment.
Figure 13:
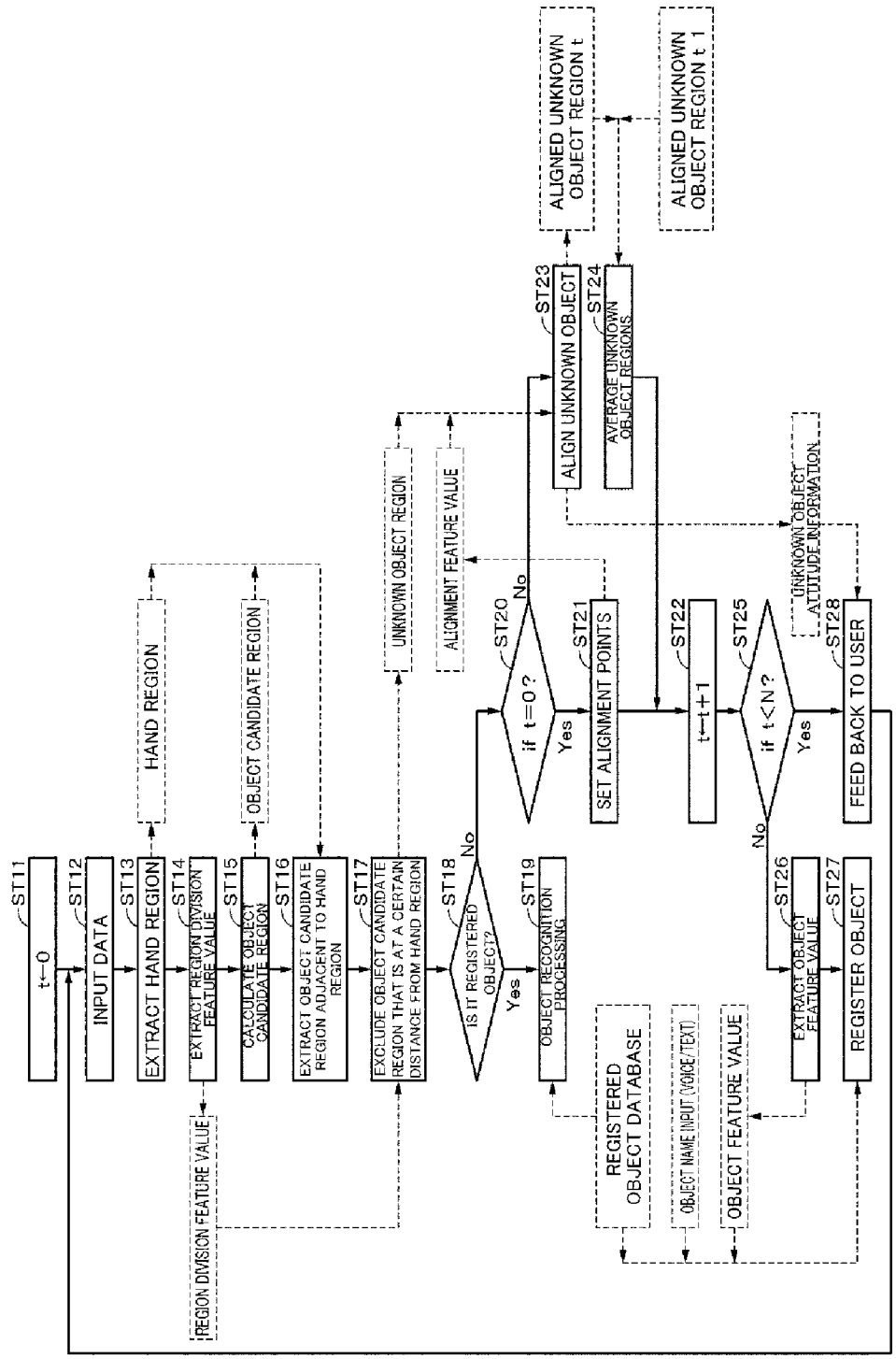
FIG. 13 is a diagram in which information obtained by predetermined processing is added to the flowchart illustrated in FIG. 12.

Next, a processing flow of the information processing device 10 will be described. FIG. 12 is a flowchart illustrating a flow of processing executed by the information processing device 10. Further, FIG. 13 is a diagram in which information and the like obtained in each processing are added to the flowchart illustrated in FIG. 12.

In step ST11, a first step (t=0) of processing is performed. Note that the control unit 11 stores the number of times t (the number of times of learning) of steps of processing described below. Then, the processing proceeds to step ST12.

In step ST12, data is input to the information processing device 10. The data is, for example, image data including a state in which the user holds an unknown object, and is acquired by the image sensor 12. The image data acquired by the image sensor 12 is input to the control unit 11 as an input image. Then, the processing proceeds to step ST13.

In step ST13, the hand region extraction unit 22a performs hand region extraction processing on the input image. As a result of the processing, a hand region included in the input image is extracted. Then, the processing proceeds to step ST14.

In step ST14, the region division feature value extraction unit 21a extracts a feature value for each pixel of the input image. As a result of the processing, a region division feature value that includes feature values (e.g., color information and depth information) for each pixel is extracted. Then, the processing proceeds to step ST15.

In step ST15, the object candidate region extraction unit 22b extracts an object candidate region in the input image. As a result of the processing, for example, a plurality of object candidate regions are extracted. Then, the processing proceeds to step ST16.

The processing of step ST16 and step ST17 following step ST16 is performed by the unknown object candidate region extraction unit 22c. In step ST16, the unknown object candidate region extraction unit 22c uses the results of extracting the hand region and the object candidate regions obtained in the processing of steps ST13 and ST15 to extract object candidate regions adjacent to the hand region. Then, the processing proceeds to step ST17.

In step ST17, the unknown object candidate region extraction unit 22c uses the depth information, which is included in the region division feature values obtained in the processing of step ST14, to exclude an object candidate region that is at a certain distance from the hand region in the depth direction. As a result of the processing, an unknown object candidate region is extracted from the plurality of object candidate regions. Then, the processing proceeds to step ST18.

In step ST18, the unknown object determination unit 23 determines whether or not the unknown object candidate region extracted in step ST17 is a registered object. For example, the unknown object determination unit 23 compares the region of a learned object stored in the storage device 16 with the unknown object candidate region. Then, if the regions of learned objects stored in the storage device 16 include a region similar to the unknown object candidate region to a certain extent or more, the unknown object determination unit 23 determines that the object to be recognized is an already registered body, that is, not an unknown object. In this case, the processing proceeds to step ST19, object recognition processing for recognizing the object included in the input image is performed, and the result of the object recognition processing is used for a purpose suitable for an application.

In the processing in step ST18, if the regions of learned objects stored in the storage device 16 do not include a region similar to the unknown object candidate region to a certain extent or more, the unknown object determination unit 23 determines that there is no registered body having the unknown object candidate region, that is, the object to be recognized is an unknown object. In this case, the processing proceeds to step ST20.

In step ST20, it is determined whether or not it is the first processing, that is, t=0. If it is the first processing, that is, t=0, the processing proceeds to step ST21.

In step ST21, the alignment feature value extraction unit 21b sets tracking points (alignment points) at predetermined positions in the input image. Then, the alignment feature value extraction unit 21b obtains an alignment feature value, which is a feature value for each tracking point. Then, the processing proceeds to step ST22. In step ST22, t is incremented (+1).

In the determination processing of step ST20, if t=0 is not satisfied, the processing proceeds to step ST23. In step ST23, the alignment processing unit 25 performs alignment processing on a plurality of point-of-view images acquired based on the change in attitude of the unknown object made according to the output of the feedback information. For example, when an unknown object candidate region is extracted after t=1, tracking points are searched for in the image, and changes in position of the tracking points are obtained, so that a difference between the attitude of the object at t=0 and the attitudes of the object at t=1 and thereafter can be determined.

The alignment processing unit 25 can correct the unknown object candidate region in the current frame to the same attitude as when t=0 by performing the alignment processing for aligning the tracking points. Therefore, the processing in step ST23 obtains information related to the attitude of the unknown object in the current frame (hereinafter, referred to as the unknown object attitude information as appropriate). The unknown object attitude information is information indicating that, for example, the corresponding object is oriented in the right direction or other or in the vertical direction with respect to the attitude of the unknown object at t=0. The unknown object attitude information is used when providing feedback to the user. Following the processing of step ST23, the processing proceeds to step ST24.

In step ST24, processing of integrating the unknown object candidate region one frame before and the current unknown object candidate region is performed. As the integration processing, for example, processing suitable for the purpose such as region averaging or region union may be applied. For example, the control unit 11 obtains an average of the aligned unknown object candidate region obtained in the processing of step ST23 and the unknown object candidate region aligned one frame before (t−1). Then, the processing proceeds to step ST22. As described above, in step ST22, t is incremented (+1).

Following the processing of step ST22, processing of step ST25 is performed. In step ST25, it is determined whether or not a learning count t for the unknown object reaches a specified learning count N. When the learning count t for the unknown object reaches the specified learning count N, the processing proceeds to step ST26.

In step ST26, the feature value of the unknown object candidate region is extracted by the object feature value extraction unit 21c on the basis of the plurality of point-of-view images based on different attitudes of the unknown object. Then, the processing proceeds to step ST27, and the object feature value, which is the feature value of the unknown object, is registered in the storage device 16. In the subsequent steps of processing (e.g., the determination processing in step ST18), the unknown object is treated as a known (learned) object. Note that, when the object feature value of the unknown object is stored in the storage device 16, the object feature value may be stored in association with predetermined additional information. Such additional information is, for example, at least one of an object name (name) of the object to be registered, a purpose, and information for controlling, when the information processing device 10 next recognizes an object to be registered, the operation of the information processing device 10 for the object. The object name is registered by voice input or character input using the input unit 13.

In the processing in step ST25, when the learning count t for the unknown object is less than the specified learning count N, the processing proceeds to step ST28. In step ST28, the feedback information generation unit 24 generates feedback information. For example, the feedback information generation unit 24 refers to the unknown object attitude information and generates feedback information such that an image including the attitude of the unknown object that has not been obtained yet can be obtained. Then, feedback based on the feedback information generated by the feedback information generation unit 24 is provided to the user. Then, the processing returns to step ST12.

<Application Example>

Next, an application example of the embodiment will be described. Note that the content of the present disclosure is not limited to the application example described below.

Figure 14:
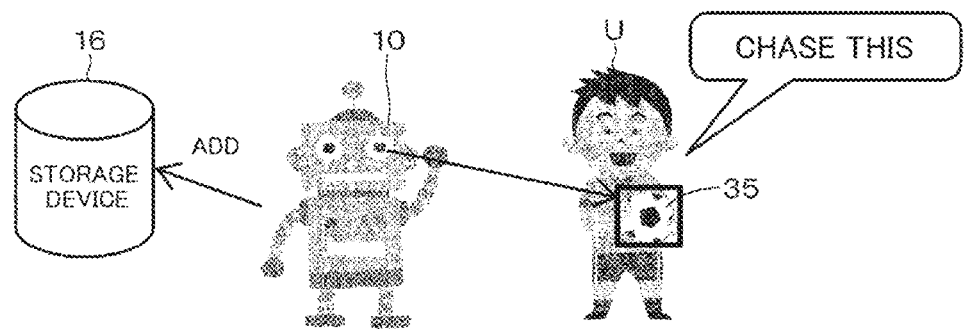
FIGS. 14A and 14B are diagrams for explaining an application example of the present disclosure.
Figure 14:
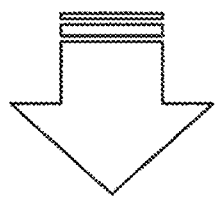
Figure 14:
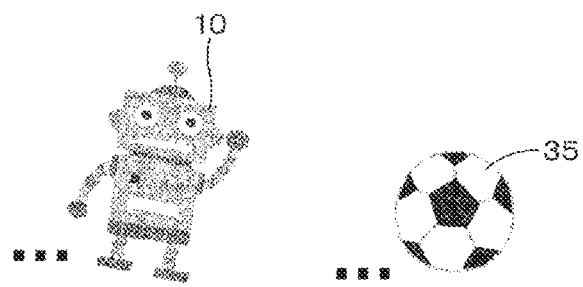

For example, as illustrated in FIG. 14A, assume a scene in which a user U holds a soccer ball 35. In addition, assume a robot serving as the information processing device 10. The soccer ball 35 is an unknown object to the robot. As described in the embodiment, the user U shows the soccer ball 35 to the robot in a plurality of attitudes to cause the robot to recognize the soccer ball 35. At that time, the user U utters a voice of "Chase this".

The robot learns the shapes of the soccer ball 35 in different attitudes and performs on voice recognition on the voice of the user U. Control information of the robot corresponding to the result of the voice recognition is stored in the storage device 16 in association with the shape of the soccer ball 35. When the robot recognizes the soccer ball 35 again after learning the soccer ball 35, the robot operates based on the control information associated with the shape of the soccer ball 35. In the present example, as illustrated in FIG. 14B, when the robot recognizes the soccer ball 35, the robot chases the soccer ball 35. In this way, it is possible to cause the information processing device 10 to recognize an object having any shape and also to specify an action to the object.

Figure 15:
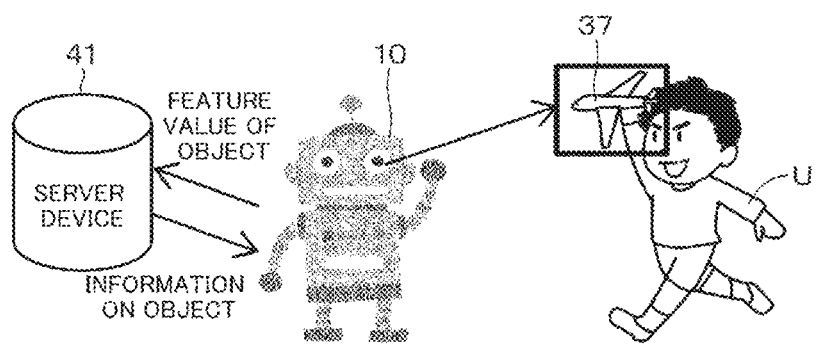
FIG. 15 is a diagram for explaining another application example of the present disclosure.

Further, an object touched by the user's hand may be automatically recognized. For example, as illustrated in FIG. 15, assume that the user U holds an object 37 which is a model of an airplane. The information processing device 10 automatically recognizes the shape of the object 37 adjacent to the hand region. In this case, feedback may be provided to the user U as in the case of the embodiment, but if the robot can obtain images based on a plurality of attitudes of the object 37 without feedback (e.g., if the robot always recognizes the vicinity of the hand of the user U), no feedback may be provided.

The robot extracts feature values of the object 37 as in the case of the embodiment. Then, the extracted feature values of the object 37 (object region, color information, etc.) are transmitted to a server device 41 by using the communication unit 17, for example. The server device 41 searches a database based on the feature values transmitted from the robot. Then, information on the object having the features is transmitted to the robot. The information on the object is information related to the object, and in the present example, it includes the name of the object such as "airplane", and introduction of books, events, web pages related to the airplane, other airplane models, and their prices. The robot notifies the user U of the information on the object transmitted from the server device 41 by voice, video, or the like.

It is expected that an object held by the user is the object that the user is interested in. The information processing device 10 recognizes the object in the same manner as in the embodiment, acquires information related to the object, and presents it to the user, so that the user can obtain information related to the object that the user himself/herself is interested in, without taking any action.

The information processing device 10 may be installed at a store, not at home. Then, the user presents an object desired to be purchased to the information processing device 10 in a plurality of attitudes. The information processing device 10 extracts feature values of the object and transmits the feature values to a server device inside the store (or outside the store). The server device acquires information related to the price of the object and the like corresponding to the feature values and presents the acquired information to the user. After the price and the like are presented, payment using the information processing device 10 may be performed. In this way, the place where the information processing device 10 is installed can be an appropriate place.

<Modified Example>

Although the embodiments of the present disclosure are specifically described above, the content of the present disclosure is not limited to the above-described embodiment, and various modifications are possible based on the technical idea of the present disclosure. Hereinafter, modified examples will be described.

Part of the processing in the information processing device 10 described above may be performed by another device, for example, a server device on the cloud. For example, all or a part of the functions of the control unit 11 may be provided in the server device, so that the server device can perform processing corresponding to the function(s). Further, the input unit 13 and/or the output unit 14 may be remote control devices that are separate from the information processing device 10, or may be devices (television device, smart phone, etc.) different from the information processing device 10. Further, the information processing device 10 may be configured not to include the image sensor 12, and in such a configuration, image data is supplied from an image capturing device to the information processing device 10.

The processing order of the above-described plurality of steps of processing may be changed within a range in which no technical contradiction occurs. Further, a plurality of steps of processing may be performed in time series, or some steps of processing may be performed in parallel.

In the embodiment, images obtained based on a plurality of attitudes of an unknown object are used. In such a use, a 3D model may be generated by making use of the region and depth information of an unknown object that has been acquired in each image and has been aligned, and the 3D model may be registered as a feature value of the object. In object recognition after the registration, object recognition processing using a three-dimensional 3D model is possible. As a method for generating the 3D model, a known method (e.g., a method called visual volume intersection) can be applied.

The configurations, methods, steps, shapes, materials, numerical values, and others mentioned in the above-described embodiment and modified examples are merely examples. Instead, different configurations, methods, steps, shapes, materials, numerical values, and others may be used as necessary, and they may also be replaced with known ones. Further, the configurations, methods, steps, shapes, materials, numerical values, and others in the embodiment and modified examples can be combined with each other as long as no technical contradiction occurs.

The present disclosure may also be configured as follows.

(1)
An information processing device including
an identification unit that detects a hand region of a person who is in contact with an object included in an input image and identifies an object region that is a region of the object based on a result thereof,
a specification unit that specifies an unknown object candidate region that is a candidate for a region of an unknown object from among the object regions identified by the identification unit,
a determination unit that determines whether the object is an unknown object based on the unknown object candidate region, and
a generation unit that generates, when the object is an unknown object, feedback information for changing an attitude of the unknown object with respect to the person.

(2)
The information processing device according to (1), including
an alignment processing unit that performs alignment processing on a plurality of point-of-view images acquired based on a change in attitude of the unknown object made according to the output of the feedback information.

(3)
The information processing device according to (2), including
a feature value acquisition unit that acquires a feature value of the unknown object obtained based on the plurality of point-of-view images.

(4)
The information processing device according to (3), wherein
the feature value of the unknown object is stored in association with predetermined information.

(5)
The information processing device according to (4), wherein
the predetermined information includes at least one of a name of the unknown object and control information for controlling an operation of the unknown object.

(6)
The information processing device according to any one of (3) to (5), including
an information acquisition unit that supplies a feature value of the unknown object to an external device and acquires information related to the unknown object from the external device.

(7)
The information processing device according to any one of (1) to (6), including output unit that performs output based on the feedback information.

(8)
The information processing device according to (7), wherein
the output unit is at least one of a speaker device and a display device.

(9)
The information processing device according to any one of (1) to (8), wherein output based on the feedback information is voice output.

(10)
The information processing device according to any one of (1 to (9), wherein output based on the feedback information is display output.

(11)
The information processing device according to (10), wherein
the display includes an unknown object region specified by the specification unit.

(12)
The information processing device according to (10), wherein
the display includes an animation display.

(13)
The information processing device according to any one of (1) to (12), wherein output based on the feedback information is a predetermined operation of the information processing device.

(14)
An information processing method including
detecting, by an identification unit, a hand region of a person who is in contact with an object included in an input image to identify an object region that is a region of the object based on a result thereof,
specifying, by a specification unit, an unknown object candidate region that is a candidate region of an unknown object region from among the object regions identified by the identification unit,
determining, by a determination unit, whether the object is an unknown object based on the unknown object candidate region, and
generating, by a generation unit, when the object is an unknown object, feedback information for changing an attitude of the unknown object with respect to the person.

(15)
A program for causing a computer to execute an information processing method including
detecting, by an identification unit, a hand region of a person who is in contact with an object included in an input image to identify an object region that is a region of the object based on a result thereof, specifying, by a specification unit, an unknown object candidate region that is a candidate region of an unknown object region from among the object regions identified by the identification unit, determining, by a determination unit, whether the object is an unknown object based on the unknown object candidate region, and generating, by a generation unit, when the object is an unknown object, feedback information for changing an attitude of the unknown object with respect, to the person.

(16)

The program according to (15), causing the computer to execute the information processing method including performing, by an alignment processing unit, alignment processing on a plurality of point-of-view images acquired based on the change in attitude of the unknown object made according to the output of the feedback information.

(17)

The program according to (16), causing the computer to execute the information processing method including acquiring, by a feature value acquisition unit, a feature value of the unknown object obtained based on the plurality of point-of-view images.

(18)

The program according to (17), causing the computer to execute the information processing method, wherein the feature value of the unknown object is stored in association with predetermined information.

(19)

The program according to (17) or (18), causing the computer to execute the information processing method including supplying, by an information acquisition unit, a feature value of the unknown object to an external device and acquiring, by the information acquisition unit, information related to the unknown object from the external device.

(20)

The program according to any one of (15) to (19), causing the computer to execute the information processing method including performing, by an output unit, output based on the feedback information.

REFERENCE SIGNS LIST

10 Information processing device,
11 Control unit,
12 Image sensor,
14 Output unit,
17 Communication unit,
23 Unknown object determination unit,
24 Feedback information generation unit,
25 Alignment processing unit

The invention claimed is:

1. An information processing device comprising:
an identification unit configured to
detect a hand region in contact with an object included in an input image, and
identify each object region of a plurality of object regions of the object within a predetermined distance of the detected hand region based on the input image;
a specification unit configured to specify at least one unknown object candidate region from among the plurality of object regions identified by the identification unit;
a determination unit configured to determine whether the object is unknown based on the at least one unknown object candidate region; and
a generation unit configured to generate, when the object is unknown, feedback information for changing an attitude of the unknown object in a direction determined according to an initial attitude of the at least one unknown object candidate region,
wherein the identification unit, the specification unit, the determination unit, and the generation unit are each implemented via at least one processor.

2. The information processing device according to claim 1, further comprising:
an alignment processing unit configured to perform alignment processing on a plurality of point-of-view images acquired based on each change in attitude of the unknown object made according to output of the generated feedback information,
the alignment processing unit is implemented via at least one processor.

3. The information processing device according to claim 2, further comprising:
a feature value acquisition unit configured to acquire a feature value of the unknown object obtained based on the plurality of point-of-view images,
the feature value acquisition unit is implemented via at least one processor.

4. The information processing device according to claim 3, wherein
the feature value of the unknown object is stored in association with predetermined information according to an input of a user.

5. The information processing device according to claim 4, wherein
the predetermined information includes at least one of a name of the unknown object or control information for controlling an operation of the unknown object.

6. The information processing device according to claim 3, further comprising:
an information acquisition unit configured to supply a feature value of the unknown object to an external device and acquires information related to the unknown object from the external device,
the information acquisition unit is implemented via at least one processor.

7. The information processing device according to claim 1, further comprising:
an output unit configured to perform output based on the feedback information,
wherein the output unit includes at least one of a speaker device or a display device.

8. The information processing device according to claim 7, wherein
the output unit includes the speaker device and the display device.

9. The information processing device according to claim 7, wherein
the output based on the feedback information is voice output.

10. The information processing device according to claim 7, wherein
the output based on the feedback information is display output.

11. The information processing device according to claim 10, wherein
the display output includes each unknown object candidate region specified by the specification unit.

12. The information processing device according to claim 10, wherein
the display output includes an animation display.

13. The information processing device according to claim 1, wherein
an output determined based on the feedback information includes a predetermined operation of the information processing device.

14. An information processing method comprising:
detecting, by an identification unit implemented via at least one processor, a hand region in contact with an object included in an input image to identify each object region of a plurality of object regions of the object within a predetermined distance of the detected hand region based on the input image,
specifying, by a specification unit implemented via the at least one processor, at least one unknown object candidate region from among the plurality of object regions identified by the identification unit;
determining, by a determination unit implemented via the at least one processor, whether the object is unknown based on the at least one unknown object candidate region; and
generating, by a generation unit implemented via the at least one processor, when the object is unknown, feedback information for changing an attitude of the unknown object in a direction determined according to an initial attitude of the at least one unknown object candidate region.

15. A non-transitory computer-readable storage medium having embodied thereon a program, which when executed by a computer causes the computer to execute an information processing method, the method comprising:
detecting, by an identification unit of the computer, a hand region in contact with an object included in an input image to identify each object region of a plurality of object regions of the object within a predetermined distance of the detected hand region based on the input image,
specifying, by a specification unit of the computer, at least one unknown object candidate region from among the plurality of object regions identified by the identification unit;
determining, by a determination unit of the computer, whether the object is unknown based on the at least one unknown object candidate region; and
generating, by a generation unit of the computer, when the object is unknown, feedback information for changing an attitude of the unknown object in a direction determined according to an initial attitude of the at least one unknown object candidate region.

16. The non-transitory computer-readable storage medium according to claim 15, wherein the method further comprises:
performing, by an alignment processing unit of the computer, alignment processing on a plurality of point-of-view images acquired based on each change in attitude of the unknown object made according to output of the generated feedback information.

17. The non-transitory computer-readable storage medium according to claim 16, wherein the method further comprises:
acquiring, by a feature value acquisition unit of the computer, a feature value of the unknown object obtained based on the plurality of point-of-view images.

18. The non-transitory computer-readable storage medium according to claim 17, causing the computer to execute the information processing method, wherein
the feature value of the unknown object is stored in association with predetermined information according to an input of a user.

19. The non-transitory computer-readable storage medium according to claim 17, wherein the method further comprises:
supplying, by an information acquisition unit of the computer, a feature value of the unknown object to an external device; and
acquiring, by the information acquisition unit, information related to the unknown object from the external device.

20. The non-transitory computer-readable storage medium according to claim 15, wherein the method further comprises:
performing, by an output unit of the computer, output based on the feedback information.

* * * * *